Oct. 13, 1936. J. V. PARKER 2,057,109
GAS LOCK FOR AUTOMOBILES
Filed Jan. 9, 1936
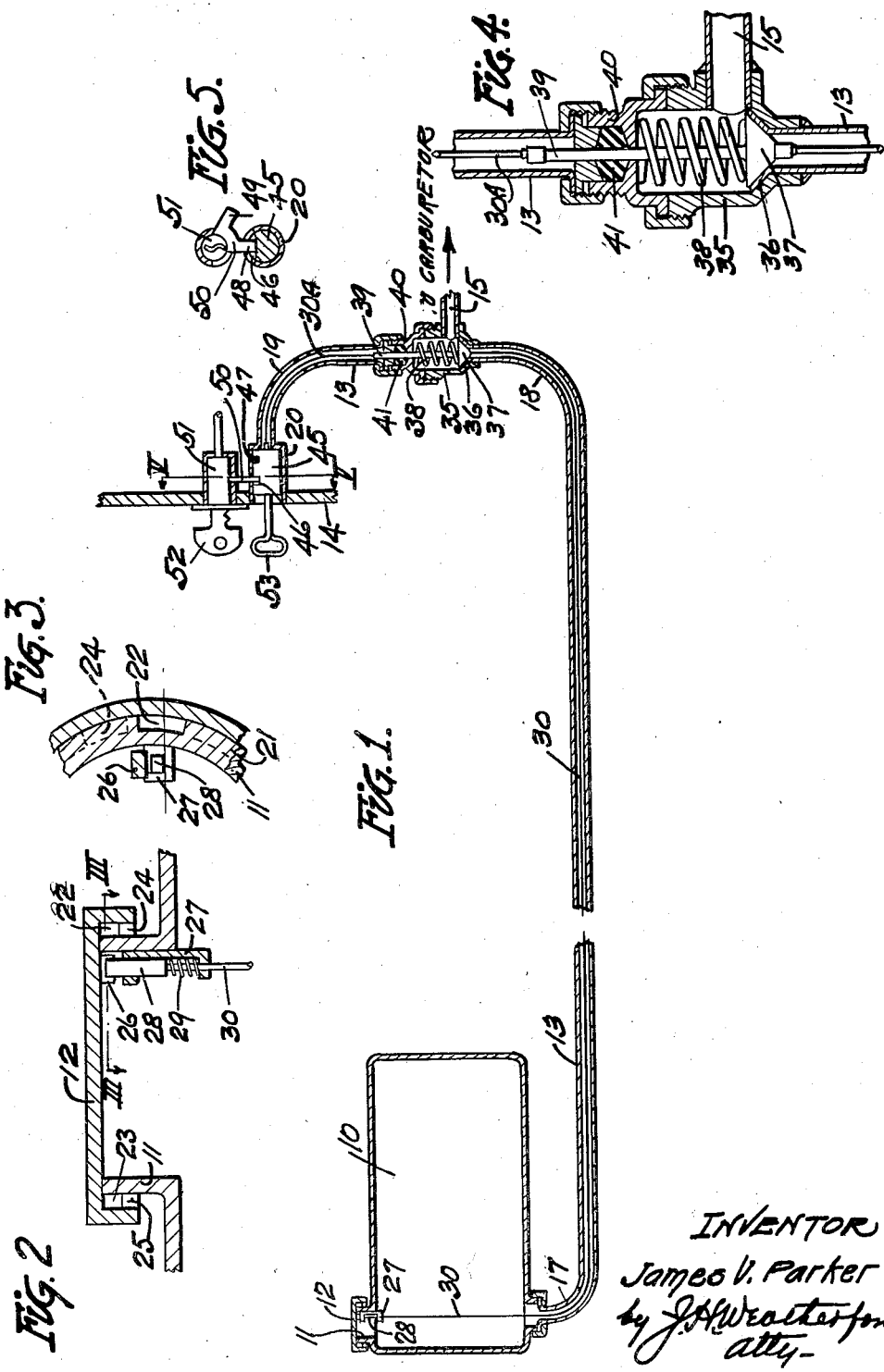
INVENTOR
James V. Parker
by J. H. Weatherford
atty.

Patented Oct. 13, 1936

2,057,109

UNITED STATES PATENT OFFICE 2,057,109

GAS LOCK FOR AUTOMOBILES

James V. Parker, Memphis, Tenn.

Application January 9, 1936, Serial No. 58,305

2 Claims. (Cl. 70—90)

This invention relates to means adapted to be mounted on the dash board of an automobile for controlling access to the contents of the fuel tank and flow from said tank to the carburetor of the car.

The object of the invention is to provide means controlled by a lock on the dash of the car, which preferably is a part of the ignition system, for preventing access to the gas tank and also preventing flow from the gas tank to the engine except when the device shall have been unlocked as by switching on the ignition system for the engine.

The means by which this and other objects are accomplished, and the manner of their accomplishment will readily be understood from the following specification, on reference to the accompanying drawing, in which,—

Fig. 1 is a sectional elevation showing the gas tank of an automobile, the fuel pipe therefrom with a lateral branch leading toward the carburetor of the engine and with a construction beyond the branch leading to the instrument board of the automobile.

Fig. 2 is an enlarged section through the filler cap of the tank showing the locking means; and Fig. 3 a fragmentary section taken on the line III—III of Fig. 2.

Fig. 4 is an enlarged section through the gas lock and through a stuffing box introduced between the branch of the fuel pipe leading to the carburetor and the control lock on the dash, and Fig. 5 is a section taken on the line V—V of Fig. 4.

Referring now to the drawing in which the various parts are indicated by numerals, 10 is a gas tank having a filling neck 11 and filling cap 12. 13 is a fuel pipe leading from the fuel tank to the instrument board 14 of the automobile, and having a lateral branch 15 leading to the carburetor of the engine (not shown).

Straight portions of the pipe 13 are connected to the fuel tank 10 and together through smooth easy bends 17, 18 and 19, the latter bend terminating in an enlarged instrument board section 20.

The filling neck 11 has an annular flange 21 which is interrupted by two oppositely disposed slots 22, 23, and the filling cap 12 has complementary lugs 24, 25 adapted to drop through these slots and be turned to engage under the flange 21 to hold the cap in place. The cap 12 is also provided with a depending lug 26. 27 is a bracket secured as by welding to the filling neck 11. Slidably mounted through the upper portion of the bracket 27 is a locking bolt 28 which is normally held in raised position by a spring 29. When in this raised position this bolt engages the lug 26 to prevent the turning movement of the filling cap necessary for its removal. Secured to the locking bolt 28 is a flexible member 30 such as a wire which leads downwardly and thence through the various portions of the fuel pipe to the dash, this connector as shown, being in two sections 30 and 30A.

The pipe 13 is interrupted at the branch 15, by an enlarged fitting 35, from which the branch leads laterally. A seat 36 is formed in this fitting below the branch 15 against which a valve 37 is normally held seated by a spring 38 to cut off fuel flow from the tank to the branch.

The connector 30 is secured as by a threaded joint into the lower end of the valve. 39 is a valve stem which extends upward from the valve through a stuffing box 40 having suitable packing 41, to prevent leakage of fuel toward the instrument board, or flow of air from the board end of the pipe into the fitting 35. The section 30A of the connector is secured to the valve stem 39, as by a threaded joint and extends therefrom through the tube 13 to a plunger 45, to which it is suitably secured.

The plunger 45 is slidably mounted in the enlarged dash section 20 and is provided with slots 46 and 47 which are adapted to be engaged by lugs 48 and 49 carried by a bar 50 which projects from a lock 51, this lock preferably being the ignition lock of the car, and which bar may be turned as by the lock key 52 to bring the lug 48 into or out of engagement with the notch 46 or the lug 49 into or out of engagement with the notch 47, this interlocking preventing movement of the plunger except when the key 52 is turned in the lock, as by turning on the ignition of the car in usual manner.

Secured to the forward end of the member 45 is a handle member 53 by which the plunger 45 is manually pulled forward when the lug 48 is disengaged from the notch 46, the plunger being then held in such drawn out position by engagement of the lug 49 with the notch 47, until reverse turning movement of the key disengages the lug 49 and permits the springs 38 and 29 acting jointly to retract the plunger, seat the valve 37 and advance the locking lug 28 into holding position in front of the cap lug 26.

In using the device the key 52 is turned disengaging the lug 48 from the slot 46 but not engaging the lug 49. The handle member 53 is then pulled forward and the lug 49 engages with the notch 47 to hold the plunger 45 in such drawn out position. Forward movement of the plunger 45 acting through the connector 30A raises the valve 37 from its seat and permits fuel flow through the pipe 13 and the branch 15 to the carburetor in the usual manner. Also the continuation 30 of the connector 30A, pulls down the locking bolt 28 and leaves the filling cap 12 free to be removed. The car may then be started and used and so long as it is being used with the plunger 45 retracted, fuel is free to flow to the carburetor and also access may be had through the filling cap 12 for filling or other purposes.

Should it be desired to fill the tank it is only necessary to drive to the filling station and accomplish the filling in the usual manner. It will be particularly noted that the engine may be killed as by cutting off the ignition and the ignition again turned on to release the filling cap if it is necessary that the engine be not running while filling is being accomplished. When the car is not in use the key 52 is turned, as to cut the ignition, the lug 49 is disengaged from the notch 47 and the springs 38 and 29 retract the plunger 45, seat the valve 37 against the seat 36 cutting off fuel flow to the carburetor, and advance the locking bolt 28 into position in front of the lug 26 to prevent turning movement and consequent removal of the filling cap.

It will thus be seen that except at the time when the ignition is turned on to permit actual use of the car, and therefore supposedly at least presence of the owner or his authorized agent, access cannot be had to the gas tank or fuel be withdrawn therefrom to the carburetor.

What I claim is:

1. In a fuel control for automobiles having a fuel tank, and an instrument board, a tube leading from said tank to said instrument board, a branch fitting interrupting said pipe and a branch leading from said fitting to the usual carburetor of said automobile; a valve in said fitting adapted to cut off flow to said branch and a spring urging said valve into cut off position; a filling cap, adapted to close said tank, latching means adapted to hold said cap against removal, and a spring urging said latching means into holding position; control means on said instrument board, including a plunger slidably mounted through said board in alignment with the board terminus of said pipe, said plunger having manually actuatable retracting means and having two notches therein, a lock on said board having a notched member, key actuatable, for selective engagement with or disengagement from either of said notches; a flexible member secured to said latching means, extending therefrom through said pipe to and secured to said valve, a continuation of said flexible member attached to the opposite side of said valve and continuing through said pipe to and attached to said plunger.

2. In a fuel control for automobiles having a fuel tank, and an instrument board, a tube leading from said tank to said instrument board, a branch fitting interrupting said pipe and a branch leading from said fitting to the usual carburetor of said automobile; a valve in said fitting adapted to cut off flow to said branch and a spring urging said valve into cut off position, said valve having a stem extending beyond said branch pipe through a stuffing box sealing said pipe beyond said fitting therefrom; a filling cap, adapted to close said tank, latching means adapted to hold said cap against removal, and a spring urging said latching means into holding position; control means on said instrument board, including a plunger slidably mounted through said board in alignment with the board terminus of said pipe, said plunger having manually actuatable retracting means and having two notches therein, a lock on said board having a notched member, key actuatable, for selective engagement with or disengagement from either of said notches; a flexible member secured to said latching means, extending therefrom through said pipe to and secured to said valve, a continuation of said flexible member attached to the opposite side of said valve and continuing through said pipe to an attachment with said plunger.

JAMES V. PARKER.